United States Patent [19]
Habben

[11] Patent Number: 5,862,318
[45] Date of Patent: Jan. 19, 1999

[54] SYSTEM FOR GENERATING A GAPLESS SERIES OF IDENTITY VALUES

[75] Inventor: Michael E. Habben, Issaquah, Wash.

[73] Assignee: Microsoft Corporation, Redmond, Wash.

[21] Appl. No.: 548,677

[22] Filed: Oct. 26, 1995

[51] Int. Cl.$^6$ .............................. G06F 17/30; G06F 11/34
[52] U.S. Cl. ................................ 395/182.18; 395/182.13; 395/618
[58] Field of Search ......................... 395/182.18, 182.13, 395/182.14, 182.17, 600, 601, 602, 611, 618, 620, 621

[56] References Cited

U.S. PATENT DOCUMENTS

| | | | |
|---|---|---|---|
| 5,212,789 | 5/1993 | Rago | 395/600 |
| 5,412,801 | 5/1995 | Remer et al. | 395/182.18 |
| 5,485,608 | 1/1996 | Lomet et al. | 395/600 |
| 5,546,536 | 8/1996 | Davis et al. | 395/182.18 |

Primary Examiner—Ly Hua
Attorney, Agent, or Firm—Duft, Graziano & Forest, P.C.

[57] ABSTRACT

A system for generating a gapless series of identity values in a history log maintained in a database by a database management system without adversely impacting database performance. The system comprises the steps of determining a last used identity value independent of an intervening disruptive event that is disruptive to the database management system, generating a next identity value based on the last used identity value, and inserting a record of an event into the history log wherein a change record event contains the next identity value. Determining the last used identity value in the history log depending on whether or not a disruptive event has occurred during normal transaction processing. Absent a disruptive event, the last used identity value is the identity value used in the most recent change record insertion. In the event of a disruptive event, the last used identity value is retrieved from the last change record of the last committed transaction in the history log as the database recovery phase traverses the history log to identify committed transactions for reapplication and incomplete transactions for rollback to bring the database to a consistent state.

16 Claims, 4 Drawing Sheets

|  | 210 | 220 | 230 | 240 | 250 | 260 |
|---|---|---|---|---|---|---|
|  | LINE | TABLE | ACTION | COL1 | COL2 | IDTCOL |
| 201 | 1 | 1 | BGNTRAN | — | — | — |
| 202 | 2 | 1 | INSERT | 1 | 2 | 10 |
| 203 | 3 | 1 | INSERT | 3 | 4 | 11 |
| 204 | 4 | 1 | INSERT | 5 | 6 | 12 |
| 205 | 5 | 1 | COMMIT | — | — | — |

*FIG. 2*

305 308 310 314 318 320 create table histlog(col1 integer, col2 integer, idtcol integer identity (seed:10, increment:1))

300         325  326

\* \* \*

335         330 begin transaction

336 — insert histlog (col1, col2) values (1,2)

337 — insert histlog (col1, col2) values (3,4)

338 — insert histlog (col1, col2) values (5,6)

commit transaction

SYSTEM FOR GENERATING A GAPLESS SERIES OF IDENTITY VALUES

FIELD OF THE INVENTION

This invention relates to field of database management systems and in particular to a system for generating a gapless series of identity values in a database independent of an intervening disruptive event.

PROBLEM

Computer application programs typically use a database to manage data related to the application program or to maintain a history of database activity related to the application. Among the reasons a database is used to manage data is the databases ability to store and retrieve the data quickly and accurately coupled with the database's durability in the case of a disruptive event such as a power outage, hardware failure, or other significant interrupt. A database's durability is its ability to survive a disruptive event with complete and non-corrupt data.

For example, a bank in the banking industry would have a transaction processing application that allows a customer to electronically deposit funds into an account or transfer funds between accounts. In a normal funds transfer transaction a transaction processing application would break the overall transaction down into sub-transactions where funds would be subtracted from the first account and when the first sub-transaction was complete, credit the funds to the second account. When the second sub-transaction was complete the customer would receive a transaction confirmation showing the activity in both accounts. If a disruptive event occurred any time during the funds transfer and prior to the transaction confirmation, the customer's transaction would abort without any transfer occurring at all. The problem addressed by the present invention is how the supporting database generates unique identity values for each sub-transaction associated with either the confirmed transaction or the aborted transaction and how the identity value generation scheme recovers in the event of a disruptive event.

A database is a collection of data, tables, and other organizational structures stored as an operational unit on a non-volatile memory device such as a direct access disk. In the funds transfer example above, the occurrence of each sub-transaction is individually recorded in a history log on the direct access disk as each sub-transaction is executed. Thus, a confirmed transaction is one where all sub-transactions have been successfully recorded on the disk and noted in the history log so that the only task remaining is to communicate a transaction confirmation to the customer. Similarly, an aborted transaction is one where all sub-transactions have not been successfully recorded on the disk so that a disruptive event prior to a transaction confirmation requires that each recorded sub-transaction since the beginning of the overall transaction be removed or "rolled back" during database recovery.

A history log is a table maintained in a database on behalf of a specific application program. A change record is stored in the application program's history log for each change the application program makes to its database. A unique identity value is generated by the database management system as a positive integer that is included with each change record to sequentially number individual change records as they are entered in the history log. Thus, the history log can be used during a recovery phase following a disruptive event to determine if a specific transaction should be committed or rolled back, and to uniquely identify each affected record by way of each record's identity value.

Some existing database management systems separately record the last used identity value on disk each time a new identity value is generated. Other existing database management systems separately record the last used identity value of the last used confirmed transaction on disk. By recording the last used identity values on a non-volatile disk memory, the database management system can easily recover its place in the identity value sequence following a disruptive event by retrieving a copy of the last used identity value from disk. Subsequent identity values can be generated following the disruptive event based on the disk copy of the last used identity value without leaving gaps in the identity value sequence. However, this identity value generation scheme is undesirable because it at least doubles the number of disk accesses required for each change record being written to the history log because one disk access is required to write the change record to disk and a second disk access is required to record the last used identity value. Increasing the number of disk accesses serves only to further slow the database management system performance.

Other existing database management systems preallocate blocks of identity values in blocks of 1–50 and 51–100 for example. The block size and starting value in the block are recorded on disk so that the number of separate disk accesses from the previously described scheme is reduced to once per block. Individual identity values are issued from within a preallocated block of identity values as an identity value is needed. However, when a disruptive event occurs, existing database management systems lose track of the last used identity value previously saved in volatile memory. Recovery from the disruptive event is accomplished by reading the disk to determine the range of identity values in the last block allocated and merely allocating the next higher block of identity values regardless if any of the identity values from the previous block were ever used. Such an allocation scheme is undesirable for two reasons. First, although the total number of disk accesses is reduced to something less than the number of disk accesses required to save each last used identity value, any additional disk accesses beyond those required to record individual change records are undesirable because they represent unnecessary overhead that adversely affects database performance. Second, the block allocation scheme introduces gaps in the identity value series and the gaps require an explanation during recovery to allow the database management system to distinguish between a valid gap in transaction entries and a missing transaction entry.

A solution to the problem of generating a gapless series of identity values independent of a disruptive event, in a manner that does not adversely impact database performance by requiring additional disk accesses, has heretofore not been realized.

SOLUTION

The present invention generates a gapless series of identity values for use in a history log maintained in a database by a database management system without adversely impacting database performance. The invention comprises the steps of determining a last used identity value independent of an intervening event that is disruptive to the database management system, generating a next identity value based on the last used identity value, and inserting a record of an event into the history log wherein a change record event contains the next identity value. Determining last used identity value from the history log depends on whether or not a disruptive event has occurred at any time during normal database processing. Absent a disruptive event, the last used identity value is the identity value used in the most recent change record insertion. In the event of a disruptive event, the last used identity value is retrieved from the last record of the last committed transaction in the history log as the database recovery phase traverses the history log to identify committed transactions for reapplication and incomplete transactions for rollback to bring the database to a consistent state. Thus, retrieving the last used identity value from the history log as part of the recovery phase following a disruptive event avoids unnecessary disk accesses and therefore does not adversely affect database performance.

DESCRIPTION OF THE DRAWING

FIG. 2 illustrates a history log configuration in block diagram form;

FIG. 3 illustrates a history log command syntax;

DETAILED DESCRIPTION

Figure 1:
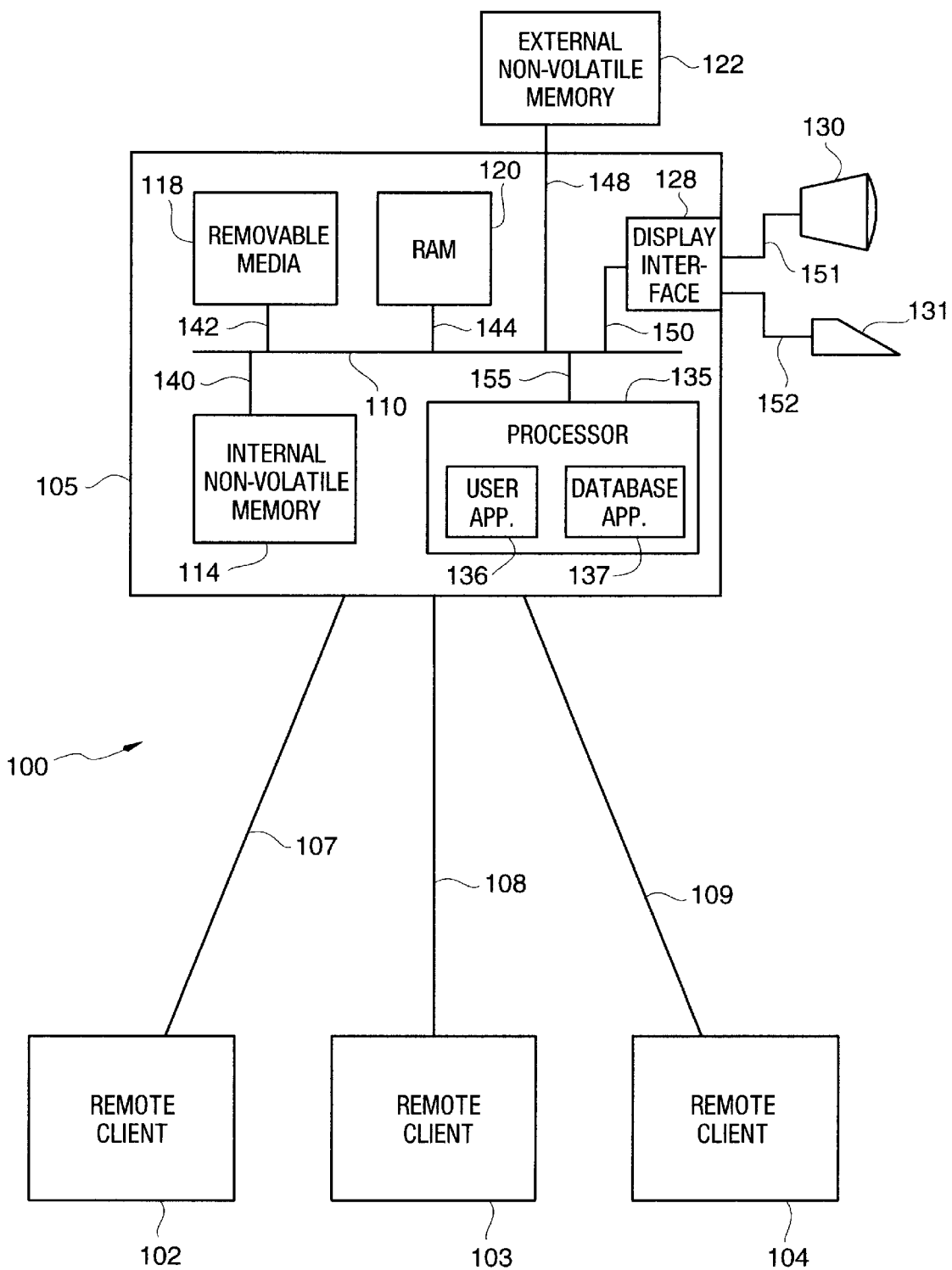
FIG. 1 illustrates a multi-user database topology in block diagram form.

Hardware Configuration - FIG. 1

FIG. 1 illustrates a multi-user database topology 100 in block diagram form. The multi-user database topology 100 includes a database management system server 105 that is connected to at least one remote client illustrated by remote clients 102–104 that are connected to server 105 by way of communication lines 107–109. The server 105 and clients 102–104 can be standard personal computers for other computing hardware with sufficient processor and memory capability to satisfy distributed database management system requirements. Specific hardware requirements for a client-server database management server such as the Structure Query Language (SQL) Server™ Version 6.0 manufactured and sold by Microsoft Corporation of Redmond, Wash., are defined in the installation and set-up guides published with the Version 6.0 database management server product.

Server 105 contains a processor 135 capable of executing an application program 136 and the database management system application 137. Processor 135 is connected to a standard communications bus 110 by way of processor lead 155. Communications bus 110 connects processor 135 to various memory devices including, but not limited to, internal non-volatile memory device 114, non-volatile removable media 118, volatile random access memory (RAM) device 120, and external non-volatile memory device 122. Memory devices 114, 118, 120, and 122 are connected to communications bus 110 by way of memory device leads 140, 142, 144, and 148 respectively.

Server 105 also includes a standard display monitor 130 and keyboard/mouse device 131. The display monitor 130 and keyboard/mouse device 131 are connected to a display interface 128 by way of display lead 151 and keyboard lead 152. Display interface 128 is connected to communications bus 110 by way of display interface lead 150.

History Log Configuration - FIG. 2

FIG. 2 illustrates a history log 200 configuration in block diagram form. History log 200 is for illustration purposes only and is not a limitation on the Microsoft® SQL Server™ Version 6.0 or the present invention.

History log 200 contains five rows 201–205 and six columns 210, 220, 230, 240, 250, and 260. Each row 201–205 represents an action entry where rows 202–204 are individual change records. Column 210 contains an integer line number for each row 201–205 in history log 200. Column 220 contains an integer table number to identify the table in the database where any entries occurred. Column 230 represents the type of activity for each entry in the database. Columns 240 and 250 represent the object data for any change to the database. Column 260 is an identity value column IDTCOL that uniquely identifies each change record recorded in history log 200.

Row 201 marks the beginning of a transaction in history log 200. Row 203, for example, is a change record in history log 200 as identified by the line number "3" in column 210. The action for the change record in row 203 is an insert as specified in the action column 230. The object data for the insert action includes a "3" and "4" in data columns 240 and 250 respectively. The identity value for the change record in row 203 is "11" as identified in the identity value column 260. Other change records in rows 202 and 204 contain different object data values in columns 240 and 250 and different identity values in column 260. The change records in rows 202 and 204 are otherwise similar to the change record described above in row 203. Row 205 action column 230 indicates that the transaction marked by the begin transaction entry in row 201 is now committed.

History Log Command Syntax - FIG. 3

FIG. 3 illustrates the command syntax 301 used to create a table such as history log 200 and record entries therein. The create command syntax 300 includes the create keyword 305 followed by the desired table structure type 308 and the specific table name "histlog" 310 to refer to history log 200. A table definition 310 follows in an argument parenthetical. The first table creation argument 314 defines a first integer data variable COL1. The second table creation argument 318 defines a second integer data variable COL2. The identity value definition 320 includes two arguments 325 and 326 for a seed value and an increment value respectively.

The action command syntax 330 illustrates a single transaction that begins with a begin transaction command 335, ends with a commit transaction command 345, and includes at least one insert change record command therebetween. The present example includes three insert change record commands 336–338. For example, the insert change record command 337 causes an insert change record to be placed in the history log 200 as illustrated in row 203. Insert change record command 337 has a data value argument that passes the data values "3" and "4" into data columns 240 and 250 respectively. The identity value "11" is generated by the database management system when executing the insert command 337. In the case of insert record command 337 the identity value "11" is generated by the last used identity value of "10" incremented by the increment value 326 which in the present example is the integer value 1. Similarly, the identity values for records inserted by insert change record commands 336–338 results in a "10" and "12" respectively as illustrated in column 260 of rows 202 and 204.

Figure 5:
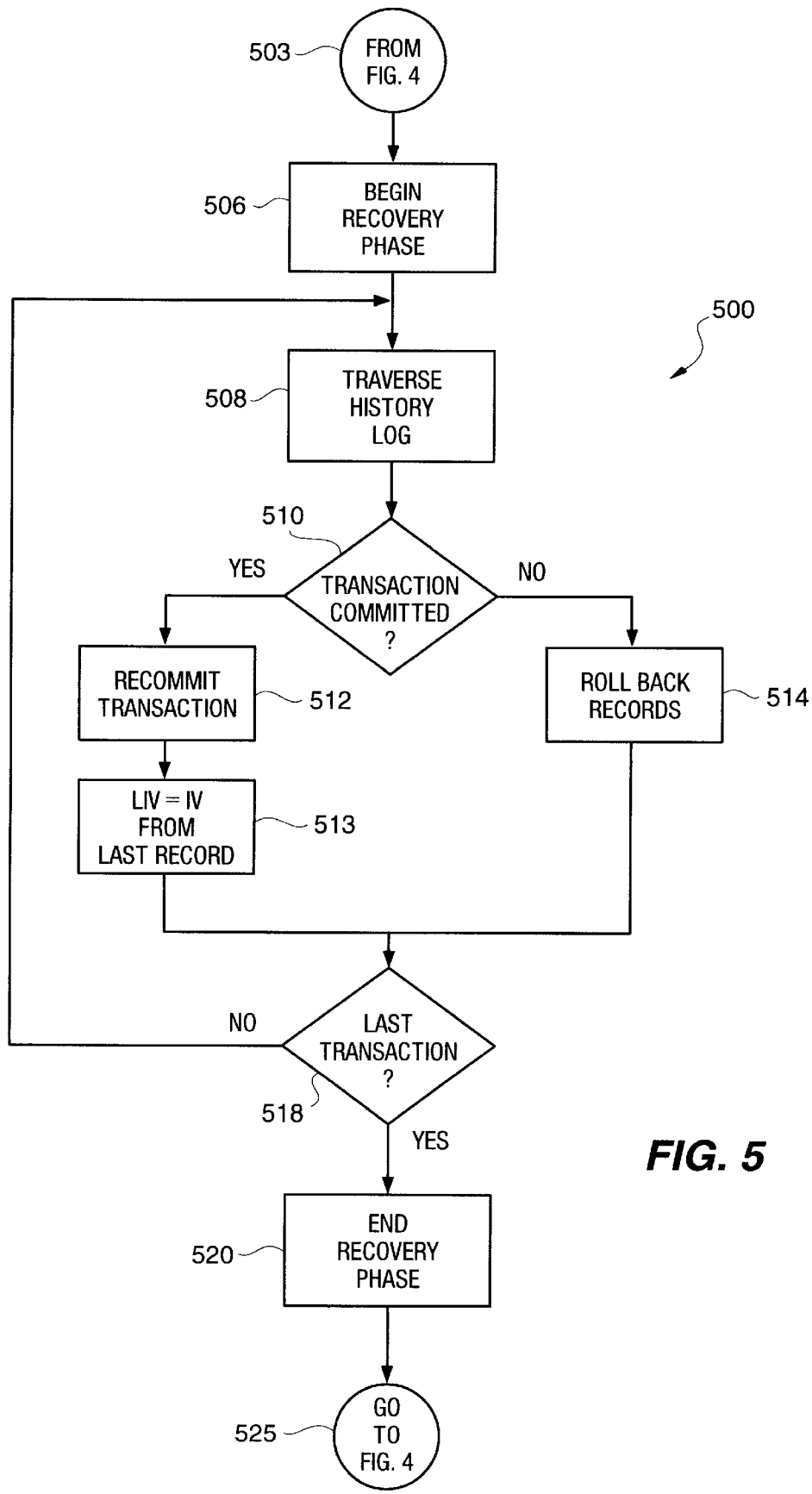
FIG. 5 illustrates the recovery phase processing steps in flow diagram form to recover a last used identity value from a non-volatile memory device.

When all change records in a transaction are complete, the commit transaction instruction 345 is used to indicate that the transaction is complete as illustrated in row 205 of history log 200. If, however, any of the insert change record commands 336–338 are interrupted by a disruptive event, the database recovery phase begins traversing history log 200 to recover the last used identity value as illustrated in FIG. 5 since the last used identity value variable and next identity value variable used by the database management system are volatile memory variables that are lost or are otherwise unreliable due to the disruptive event.

Figure 4:
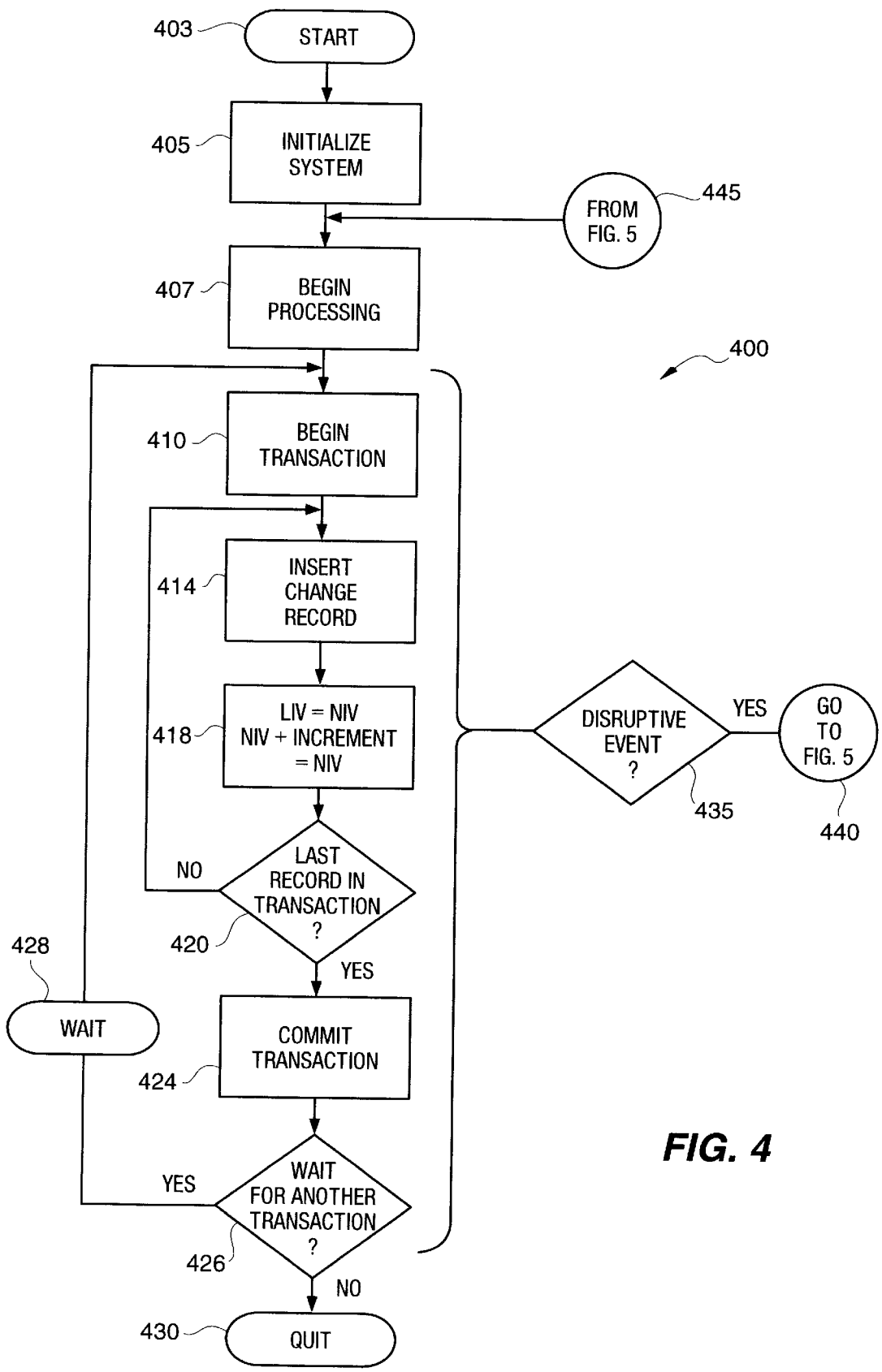
FIG. 4 illustrates the normal processing steps in flow diagram form to generate a gapless series of identity values.

Normal Processing Steps - FIG. 4

FIG. 4 illustrates normal processing steps 400 in flow diagram form to generate a gapless series of identity values. It is important to note that the application process 136 directs the overall processing in a normal processing situation. The database management system 137 accepts and executes commands such as the create command 305 or transaction commands 330 from application process 136. The normal processing steps 400 begin at 403 followed by system initialization at step 405 for the database management system 137 and application process 136. System initialization includes, but is not limited to, initializing and/or allocating volatile and non-volatile memory, configuring hardware and communication lines, and initializing software for the application process 136 generally and the database management system 137 specifically. Software initialization for the database management system 137 includes, but is not limited to, executing the create command 305 to create history log 200, and seeding the next identity value variable with identity value seed 325. The last used identity value is seeded with the identity value seed 325 minus increment value 326. Processing begins at step 407 when system initialization is complete at step 405.

The first step in processing a transaction is for application process 136 to mark the beginning of a transaction at step 410 by using the begin transaction command 335. The database management system 137 records the begin transaction event in history log 200 row 201 at step 410. As the application process 136 completes any sub-transaction in an overall transaction the database management system 137 is instructed to insert a change record at step 414 into the history log 200 using, for example, insert change record command 336. The inserted record is recorded in a non-volatile memory such as in internal non-volatile memory 114 and/or external non-volatile memory 122. At step 418 the database management system 137 updates the last used identity value LIV to equal the next identity value NIV for the record most recently inserted and the next identity value NIV is incremented by the increment value 326 for use with the next change record.

If the change record most recently inserted is not the last change record for this transaction as determined by the application process 136 at decision step 420, then processing continues at step 414. If the application process 136 determines that the change record most recently inserted is the last change record for the entire transaction at decision step 420, then the database management system 137 is instructed to execute the commit transaction command 345 at step 424. If the system is to wait for additional transactions to process as determined at decision step 426, then the system waits for the next transaction at step 428 prior to continuing at step 410. If there are no additional transactions to process as determined by the application process 136 at decision step 426, then the processing quits at step 430.

If at any time during normal processing steps 400 between the time processing begins at step 407 and processing quits at step 430 a disruptive event occurs as determined by the database management system 137 at decision step 435, then the normal processing steps 400 are interrupted at step 440 by the database recovery phase processing steps 500 illustrated in FIG. 5. Similarly, when database recovery phase processing 500 in FIG. 5 is complete, processing returns to the normal processing steps 400 in FIG. 4 at return step 445 in a coordinated manner as between the application process 136 and the database management system 137.

Recovery Phase Processing Steps - FIG. 5

FIG. 5 illustrates the database management system 137 recovery phase processing steps 500 in flow diagram form beginning at 503. The database recover phase processing begins at step 506 and includes many recovery activities that are beyond the scope of the present discussion. However, it is important to note that the present invention takes advantage of the fact that the database management system 137 will traverse history log 200 record by record and transaction by transaction at step 508 from the point in the history log 200 where the records and transactions were last verified. Thus, retrieving the last used identity value from the last committed transaction is incorporated into the database recovery phase without adversely impacting database performance.

During the history log 200 traverse, the recovery phase process determines whether each change record in the history log 200 is part of a committed transaction or an incomplete transaction at decision step 510. A committed transaction is one where the database management system 137 can identify a begin transaction entry 201 and a corresponding commit transaction entry 205 for a given transaction. If the commit transaction entry 205 is missing then the transaction is considered incomplete.

If a transaction is incomplete at decision step 510 then all records of the incomplete transaction are rolled back at step 514 so that the underlying transaction can be attempted once again when the database is in a stable state. If a transaction is complete or "committed" at decision step 510, than the transaction is recommitted at step 512. The identity value in the last record of the recommitted transaction is saved as the last used identity value for use when normal processing is restored. If the history log 200 is not completely traversed at decision step 518, then traversing continues at step 508 with the next transaction in the history log 200. If the history log 200 is completely traversed as determined at decision step 518, then the next identity value for use with the next change record insertion is set to the last used identity value plus the increment value 326 and the recovery phase ends at step 520. Processing transfers at 525 to the normal processing steps 400 at step 445 in FIG. 4.

Summary

A system for generating a gapless series of identity values in a history log maintained in a database by a database management system without adversely impacting database performance. Although specific embodiments of this invention are disclosed herein, it is expected that those skilled in the art can and will design alternate embodiments of this invention that fall within the scope of the following claims either literally or under the Doctrine of Equivalents.

What is claimed is:

1. A computer readable medium containing computer executable instructions to perform a method for generating a gapless series of identity values in a history log maintained in a database by a database management system in a computer, said method comprising steps of:

determining a last used identity value independent of an intervening disruptive event that is disruptive to said database management system absent consecutive non-volatile memory access for each determination;

generating a next identity value in said gapless series of identity values, that is based on a volatile memory copy of said last used identity value; and inserting a change record into said history log wherein said change record contains said next identity value.

2. A method according to claim 1 wherein said step of determining includes:

verifying said intervening disruptive event has not occurred; and retrieving said next identity value that was used in said most recent of said inserting step for use as said last used identity value.

3. A method according to claim 1 wherein said step of determining includes:

verifying an occurrence of said intervening disruptive event;

searching said history log for any committed transaction and any incomplete transaction;

identifying a last change record in a last committed transaction in said history log; and retrieving an identity value from said last said change record in said last committed transaction for use as said last used identity value.

4. A method according to claim 3 wherein said step of identifying includes:

retrieving at least one said transaction from said history log;

determining a status of each of said at least one said transaction wherein said status is selected from a group consisting of: committed and non-committed; and scanning each change record in each committed transaction for validity.

5. A method according to claim 1 wherein said step of generating includes:

incrementing said last used identity value by an increment seed value to create said next identity value.

6. A method according to claim 5 wherein said increment seed value is one.

7. A method for continuing a gapless series of consecutive identity values in a history log used by a database management system in a computer wherein said history log resides in non-volatile memory, said method comprising steps of:

determining a last used consecutive identity value independent of an intervening disruptive event that is disruptive to said database management system absent consecutive non-volatile memory access for each determination;

generating a next consecutive identity value in said gapless series of consecutive identity values, that is based on a volatile memory copy of said last used consecutive identity value; and inserting a change record into said history log wherein said change record contains a copy of said next consecutive identity value.

8. A method according to claim 7 wherein said step of determining includes:

verifying said intervening disruptive event has not occurred subsequent to a most recent of said inserting step; and retrieving said next consecutive identity value that was used in said most recent of said inserting step for use as said last used consecutive identity value.

9. A method according to claim 7 wherein said step of determining includes:

verifying an occurrence of said intervening disruptive event subsequent to a most recent of said inserting step;

identifying a last record in a last committed transaction in said history log; and retrieving an identity value from said last record in said last committed transaction for use as said last used consecutive identity value.

10. A method according to claim 9 wherein said step of identifying includes:

retrieving at least one transaction from said history log;

identifying each committed transaction and each non-committed transaction from among said at least one transaction; and verifying each record in each said committed transaction.

11. A method according to claim 7 wherein said step of generating includes:

incrementing said last used identity value by one.

12. A system for generating a gapless series of identity values in a history log maintained in a database by a database management system in a computer, said system comprising:

means for determining a last used identity value independent of an intervening disruptive event that is disruptive to said database management system absent consecutive non-volatile memory access for each determination;

means for generating a next identity value in said gapless series of consecutive identity values, that is based on a volatile memory copy of said last used identity value; and means for inserting a change record into said history log wherein said change record contains said next identity value.

13. A system according to claim 12 wherein said means for determining includes:

means for verifying said intervening disruptive event has not occurred; and means for retrieving said next identity value that was used in said most recent of said inserting step for use as said last used identity value.

14. A system according to claim 12 wherein said means for determining includes:

means for verifying an occurrence of said intervening disruptive event;

means for searching said history log for any committed transition and any incomplete transaction;

means for identifying a last change record in a last committed transaction in said history log; and means for retrieving an identity value from said last said change record in said last committed transaction for use as said last used identity value.

15. A system according to claim 14 wherein said means for identifying includes:

means for retrieving at least one said transaction from said history log;

means for determining a status of each of said at least one said transaction wherein said status is selected from a group consisting of: committed and non-committed; and means for scanning each change record in each committed transaction for validity.

16. A system according to claim 12 wherein said means for generating includes:

means for incrementing said last used identity value by an increment seed value to create said next identity value.

* * * * *

UNITED STATES PATENT AND TRADEMARK OFFICE
CERTIFICATE OF CORRECTION

PATENT NO.   : 5,862,318

DATED        : January 19, 1999

INVENTOR(S)  : Michael E. Habben

It is certified that error appears in the above-identified patent and that said Letters Patent is hereby corrected as shown below:

Col. 1, line 15, replace "databases" with -- database's --

Col. 2, line 64, after "Determining" insert -- the --

Signed and Sealed this

Twenty-fifth Day of May, 1999

Attest:

Q. TODD DICKINSON

*Attesting Officer*     Acting Commissioner of Patents and Trademarks